INVENTOR.
JOHN S. PILCH
BY
ATTORNEY.

March 24, 1959 J. S. PILCH 2,878,598
DETACHABLE BULLDOZER
Filed June 22, 1954 2 Sheets-Sheet 2
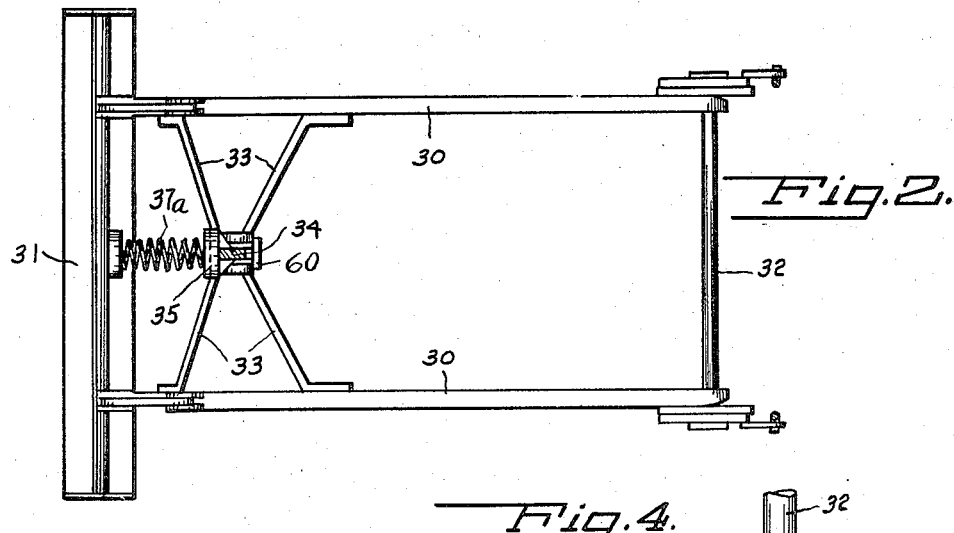
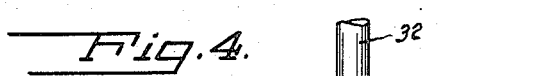
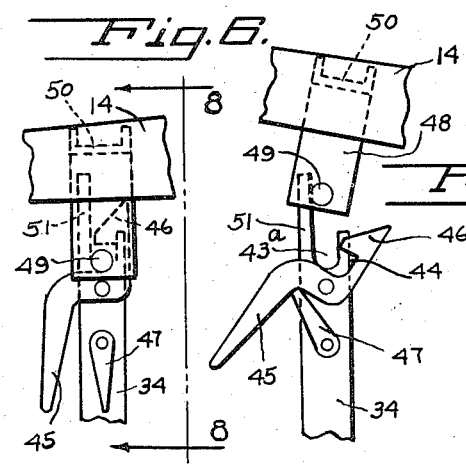
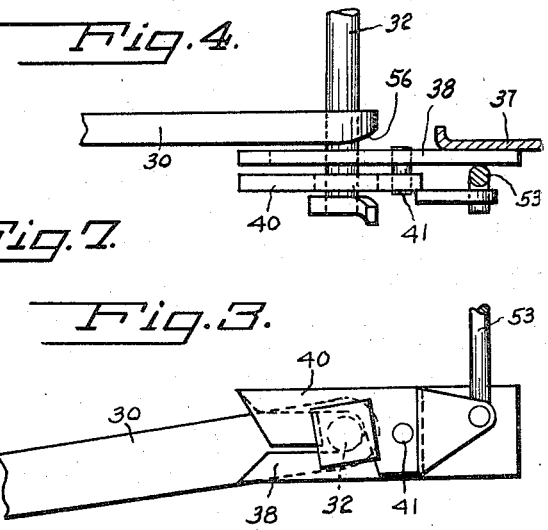
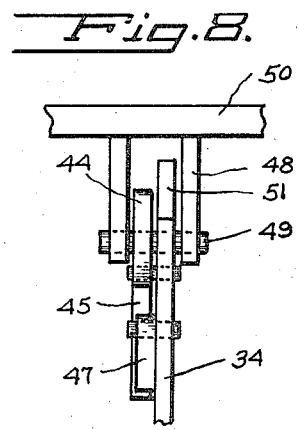
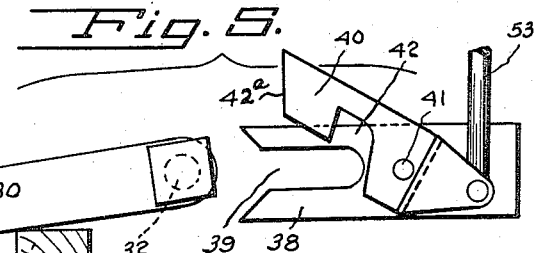
INVENTOR.
JOHN S. PILCH
BY
Raymond A. Paquin
ATTORNEY.

United States Patent Office

2,878,598
Patented Mar. 24, 1959

2,878,598

DETACHABLE BULLDOZER

John S. Pilch, Ware, Mass.

Application June 22, 1954, Serial No. 438,415

5 Claims. (Cl. 37—117.5)

This invention relates to tractor mounted implements and has particular reference to new and improved means for attaching said implements to a tractor.

An object of the invention is to provide new and improved means for attaching a bulldozer mechanism to a tractor whereby the bulldozer may be easily and quickly attached to or detached from the tractor.

Another object of the invention is to provide a device of the type set forth whereby a bulldozer may be attached to a tractor on which a loader or other implement is already mounted without removing the implement.

Another object is to provide an apparatus of the type set forth which can be automatically attached to the tractor without stopping the motion of the tractor and which can be easily and quickly detached from the tractor.

Another object is to provide an apparatus of the type set forth for easily and quickly attaching or detaching a bulldozer from a tractor of the type where the bulldozer arms need to be positioned beneath the tractor and cannot be mounted on the tractor frame.

Other objects and advantages of the invention will be apparent from the following description taken in connection with the accompanying drawings. It will be understood that changes may be made in the details of construction and arrangement of parts shown and described without departing from the spirit of the invention as set forth in the accompanying claims, as the preferred form has been given by way of illustration only.

Referring to the drawings:

Fig. 2 is a fragmentary sectional view taken on line 2—2, looking in the direction of the arrows;

Fig. 3 is a side view of one of the connections between the dozer arms and the tractor;

Fig. 4 is a top or plan view of the connections shown in Fig. 3;

Fig. 5 is a side view similar to Fig. 3, but showing the dozer arm and tractor connection disassembled;

Fig. 6 is a side view of the connection with the loader arm;

Fig. 7 is a view generally similar to Fig. 6, but showing one step in the attaching of the device to the loader arms; and Fig. 8 is a view taken on line 8—8 of Fig. 6, looking in the direction of the arrows.

Figure 1:
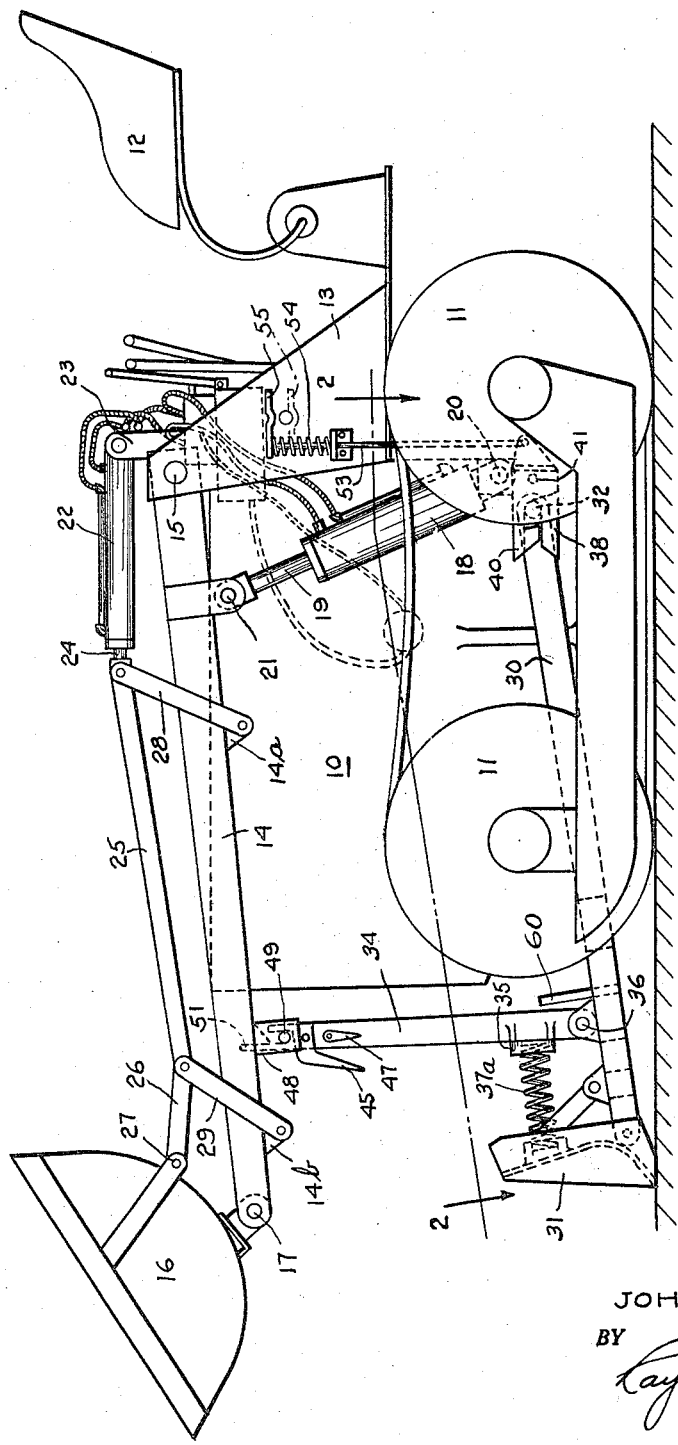
Fig. 1 is a side view of an apparatus embodying the invention.

A large number of tractors which are sold for construction and similar uses are sold with a loader or other implement mounted thereon and the use of the tractor with the loader is one of the principal uses of the tractor.

From time to time it becomes necessary to mount a bulldozer blade on the tractor for bulldozing. In the past it has required the removal of the loader from the tractor and the mounting of the bulldozer thereon and after completing the use of the bulldozer to remove the bulldozer and replace the loader on the tractor. To make these changes has required such an amount of time and manpower that often machines were returned to the dealer to make the changeover from one implement to the other which has been time consuming and costly in that the dealer is frequently located at a considerable distance from the place where the apparatus was located, thus, such changeovers are time consuming, costly and inconvenient.

It is, therefore, the principal object of the present invention to provide a new and improved arrangement whereby a bulldozer may be easily and quickly attached to or detached from the tractor on which a loader is already attached, without removing the loader from the tractor.

Referring more particularly to the drawings wherein similar reference characters designate corresponding parts throughout, the tractor shown in Fig. 1 is of the track type and includes the engine 10, wheels 11 and operator's seat 12.

On opposite sides of the tractor are provided supports 13 on which are pivotally mounted the loader arms 14 at 15 and the loader bucket 16 is pivotally mounted to the arms 14 by the pivot 17 at the forward or free ends of the loader arms.

The hydraulic jacks comprising the cylinders 18 and rams 19 are pivotally connected at one end to the tractor frame at 20 and at their opposite ends to the loader arms 14 at 21 for raising and lowering the loader arms relative to the tractor.

The bucket 16 is adapted to be pivoted relative to the loader arms 14 by means of the cylinders 22 which are pivotally connected to the supports 23 and have the rams 24 pivotally connected to the links 25 which in turn are pivotally connected to the links 26 and these links are in turn pivotally connected at 27 to the bucket 16.

The linkage 25 is connected by the link 28 to the push arm 14 and is pivotally connected to an extension 14a beneath the push arm 14. The linkage 25 and link 26, at their pivotal connections, are also pivotally connected to link 29 which is also pivotally connected to projection 14b beneath loader arm 14.

This arrangement allows the use of a relatively short and inexpensive cylinder 22 and ram 24 while providing complete and positive control of the bucket 16.

The bulldozer apparatus comprises a pair of bulldozer arms 30 connected at their forward ends to the bulldozer blade 31 and connected adjacent their opposite ends by the connecting member 32.

The arms 30 are connected by the reinforcing bars 33 which are connected together and have the upright link 34 pivotally connected thereto at 36.

The coil compression spring 37a extends between a base 35 on member 34 and the rear of the bulldozer blade 31 as hereinafter described.

The pivoting of member 34 by spring 37a is limited by stop 60.

The space between the bulldozer arms 30 is such as to allow said arms to be positioned between the wheels 11 and tracks of the tractor.

The tractor frame 37 has the connector members 38 connected thereto and the members 38 have the slots 39 in their forward ends.

The dogs or catches 40 are pivotally mounted by pins 41 on the members 38.

The forward end 42a of dog or catch 40 is tapered from the front to the rear such that engagement of a pin with said surface will tend to raise dog or catch 40 when the arms 30 are moved rearwardly toward the tractor to allow the automatic positioning of the pin in the locking slot.

Adjacent the upper end of the upright link 34 is a slot 43a and a pivoted catch member having the locking portion 44 and the handle portion 45. This catch member has the upper tapered edge 46 for pivoting the catch to open position upon engagement of said surface 46 with a pin.

If desired, the pivoted dog 47 may be provided on the upright link 34 as shown in Fig. 7 to retain the lock in open position.

On a support 50 extending between loader arms 14 is the downward projection 48 having the locking pin 49 thereon as shown in Fig. 8.

In operation, to attach the bulldozer mechanism to a tractor, the loader mechanism is raised by raising the arms 14 by means of the cylinder 18 and ram 19 and the tractor then driven over the bulldozer structure which is supported off the ground or floor by means of blocks, such as shown in Fig. 5, and the bar or rod 32 is positioned into slots 39. If the catch 40 is closed, engagement of bar 32 with tapered edge 42a on catch 40 will automatically raise or pivot catch 40 to open position and allow the bar to enter slot 39 after which the catch 40 pivots to closed position as shown in Fig. 3.

At about the same time the arms 30 are becoming attached to the members 38, the upright portion 51 on upright link 34 engages pin 49 which urges link 34 forward against the force of spring 37a and lowering of loader arms 14 allows pin 49 to drop into slot 43a.

If the catch is in closed position, engagement of pin 49 with upper tapered edge 46 acts to open the catch to allow the pin to enter the slot 43a wherein it is enclosed by the catch.

As will be seen from the foregoing description, this attaching of the bulldozer to the tractor and loader mechanism requires very little time and, in fact, can actually be accomplished without actually stopping the forward motion of the tractor and the attaching is accomplished automatically with only the lowering of the loader arms to allow the pin 49 to extend into slot 43a.

To detach the bulldozer mechanism from the tractor and loader mechanism, the tractor is stopped and then the catch held in the open position by opening the catch and placing the dog 47 in the position shown in Fig. 7 whereupon raising of the loader arms will remove pin 49 from slot 43a. Also, by moving rod 53 downward against the force of spring 54 by pushing handle 55 downward, catch 40 is pivoted about its pivot 41 to open the catch as shown in Fig. 5, and the tractor may thereupon be backed out from the bulldozer mechanism.

If desired, instead of employing the dog 47, the catch may be so formed that it balances up when open and down when closed and thereby removes the need for the dog, as stated above.

The link 34 may be attached directly or indirectly to the bulldozer arms 30, as desired.

It will be noted from Fig. 4 that the rear ends of the bulldozer arms may be provided with the tapered portions 56 for easy and true alignment.

It will also be noted that the spring 37 maintains constant pressure on the link 34 while in use so that it cannot pivot and become accidentally detached.

It is pointed out that the harder the pull by the tractor on the implement, the tighter the connection between dogs 40 and the bars or rods 32 because of the shape of slot 42.

From the foregoing it will be seen that I have provided an arrangement whereby a bulldozer may be easily and quickly attached to or detached from a tractor on which a loader is mounted without loss of time and with minimum effort.

From the foregoing, it will be seen that I have provided new and improved means for obtaining all of the objects and advantages of the invention.

I claim:

1. In combination with a loader of the type having a loader bucket mounted on the forward ends of loader arms pivoted to a tractor, and having means to raise and lower said loader bucket between a scooping position and a loading position; a demountable bulldozer attachment comprising a bulldozer blade, a pair of bulldozer arms secured to said bulldozer blade at their forward ends, an upright link mounted between said bulldozer arms adjacent said bulldozer blade, said tractor and said bulldozer arms being provided with complementary quick coupling means whereby said bulldozer arms can be quickly secured to or released from said tractor, and complementary quick coupling means between said loader arms and said upright link whereby said upright link can be quickly secured to or released from said loader arms substantially simultaneously with said bulldozer arms.

2. The device of claim 1 in which said upright link is pivotally mounted on said bulldozer arms, a stop element is provided behind said link to support said link in substantially vertical position when disconnected from a tractor, and a spring is provided to bias said link toward said stop.

3. The device of claim 1 in which said bulldozer arms are provided with tapered portions adjacent said quick coupling means for aligning said bulldozer arms with said coupling elements on said tractor.

4. The device of claim 1 in which said quick coupling elements on said tractor and on said upright link each comprise a slotted element and a hook like element, said quick coupling elements on said loader arms and on said bulldozer arms each comprise a bar to engage in the slot of the corresponding slotted element, and said hook like elements are provided with tapered surfaces so that a bar pressed into the slot cams the hook like element to one side whereby said bar can pass into said slot.

5. An attachment for a tractor having a pair of loader arms mounted on each side of said tractor and extending forwardly thereof, and a loader bucket mounted on the forward end of said loader arms and having means to raise and lower said loader arms between scooping position at ground level and an elevated position for loading trucks, said attachment comprising a bulldozing device comprising a bulldozing blade and a pair of bulldozer arms for said bulldozing blade extending rearwardly therefrom, a quick coupling element mounted at the rear end of each of said bulldozer arms, a complementary quick coupling element mounted on each side of said tractor for engagement with and coupling to a quick coupling element on one of said bulldozer arms, an upright connecting member mounted on said bulldozer arms adjacent said bulldozer blade, a quick coupling element on the upper end of said upright connecting member, and a complementary quick coupling element on the forward end of said loader arms for engagement with said quick coupling element on said upright connecting member when said tractor is moved forward into position with respect to said bulldozer arms to couple said bulldozer arms to said tractor.

References Cited in the file of this patent

UNITED STATES PATENTS

| 2,387,764 | Maxwell | Oct. 30, 1945 |
| 2,417,520 | Porch | Mar. 18, 1947 |
| 2,495,057 | Dillingham | Jan. 17, 1950 |
| 2,502,681 | Swanson | Apr. 4, 1950 |
| 2,655,742 | Washbond | Oct. 20, 1953 |
| 2,660,816 | Maxwell | Dec. 1, 1953 |
| 2,662,459 | Shore | Dec. 15, 1953 |
| 2,667,708 | Gjesdahl | Feb. 2, 1954 |
| 2,732,963 | Grubich | Jan. 31, 1956 |

FOREIGN PATENTS

| 1,029,839 | France | Mar. 11, 1953 |
| 632,890 | Great Britain | Dec. 5, 1949 |